3,532,782
POLYTETRAFLUOROETHYLENE GRANULAR POWDER AND PROCESS FOR ITS MANUFACTURE
Robert Hartwimmer, Burghausen, Salzach, Germany, assignor to Farbwerke Hoechst Aktiengesellschaft, Frankfurt am Main, Germany, a corporation of Germany
No Drawing. Filed Dec. 20, 1966, Ser. No. 603,170
Claims priority, application Germany, Dec. 30, 1965, F 48,053
Int. Cl. C08f 47/02
U.S. Cl. 264—117                                    8 Claims

ABSTRACT OF THE DISCLOSURE

A one-step process for preparing granulated polytetrafluoroethylene from the corresponding pulverized material by admixing a dispersing agent comprising an alkane-containing hydroxyl or amino groups or coupled product thereof, the ratio of pulverized material-to-dispersing agent utilized being about 1:1–10; maintaining the mixture at a temperature of about 20–300° C. and separating the granulated polytetrafluoroethylene from dispersing agent.

---

The polymerization of tetrafluoroethylene in an aqueous medium under pressure and in the presence of a substance forming free radicals provide polymers which, prior to their processing into bands, films and foils, pipes, shaped articles and intermediate products, have to be after-treated correspondingly to their applications, on account of their non uniform shape and size of particles.

According to U.S. Pat. No. 2,936,301, the grinding of polytetrafluoroethylene (PTFE) exposed in a whirl of air or gases to the shearing force of a pulverizer at a temperature in the range of from 19 to 327° C. leads to a downy powder which has a high proportion of fibrous particles and which is said to be particularly suitable for making thin sheets, bands and foils.

For making shaped articles in a ram or screw extruder, the PTFE-powders usually obtained by polymerization are not suitable since they tend to stick and therefore are difficult to convey and to dose. A processing of this kind requires a material having good flow properties and a very uniform grain size. Such properties are peculiar to granules. PTFE can, however, not be granulated by usual methods. According to U.S. Pats. Nos. 3,087,921 and 3,152,201, granule-like PTFE-products can be obtained by heating in a first step normal unsintered PTFE to a temperature in the range of from 50 to 400° C., with or without the application of pressure, whereby the non uniform porous particles are sintered or baked together and thus the hitherto loose powder is agglomerated. After having been cooled, the polytetrafluoroethylene thus treated is then reduced, in a second step, to small particles while applying shearing forces. The present invention provides a one-step process for preparing granules of polytetrafluoroethylene, which comprises heating a polytetrafluoroethylene powder, with agitation for a certain period of time, to temperatures in the range of from room temperature to the sintering temperature, preferably from room temperature (20° C.) to 150° C., in the presence of appropriate dispersing agents—preferably alkanes carrying several hydroxy and/or amino groups, and/or compounds which can formally be derived from the aforementioned alkanes by coupling them by means of the substituents.

Compared with the known processes, the process of the present invention has the advantage of being a one-step process directly providing granules from PTFE-powder and capable of being already carried out at surprisingly low temperatures. The particle size can be varied within wide limits by changing the stirring speed, varying or diluting the suspending agent. It is possible, according to the invention, to obtain granules with such a variety of particle sizes as, for example, in the range of from 100 to 400$\mu$, 500 to 1,000$\mu$ or 1,000 to 3,000$\mu$ as the main portion, but also particle sizes of a diameter ranging from 5 to 10 mm. and more. In the process of the invention, neither considerable pressures nor great shearing forces nor high temperatures act upon the polymer-influences which, as is known, may adversely affect the fine structure of a polymer.

The individual particles of a granulated PTFE-material obtained according to the invention, predominantly have a globular shape and a smooth solid, but not hard surface, which is relatively non-porous. It is for this reason that the granules obtained have excellent flow properties and do not tend to form lumps, a tendency which is, to a high extent, peculiar to untreated PTFE-powders. The product obtainable according to the process of the present invention can easily be transported on conveyor bands and chutes, it does not pile up in funnels and charging tubes, thus facilitating dosing and accumulation, properties which are extremely important for the processing of the polytetrafluoroethylene in ram or screw extruders. Needing no preliminary sintering, the product maintains, in spite of its good flow properties and its smooth and hard surface, a certain ductibility and a soft flow under elevated pressure, which are of advantage to the transparency, smoothness and lack of pores of the shaped articles made with extruders. The after-treatment according to the invention does not at all adversely affect the good mechanical, thermal and electrical properties of the polytetrafluoroethylene.

According to the process of the invention, all PTFE-types can be granulated, no matter whether it is an ultrafinely ground suspension polymer (less than 50$\mu$), an untreated suspension polymer (100–400$\mu$) or a relatively coarse-grained PTFE-powder (300–750$\mu$) or whether the soft and ductile material that can be precipitated from a PTFE-dispersion, is intended to be used. Unsintered PTFE is particularly used for the process of the invention, as is obtained by the known polymerization processes (cf. German Patent No. 1,109,370).

In addition there, mixtures of the several pulverulent PTFE-types with each other can also be granulated; PTFE-products which are modified by incorporating by polymerization small amounts of other perfluoro-olefins, are also suitable for granulation according to the process of the invention.

For obtaining the highest possible powder density, it is advisable, in many cases, to degas the PTFE-powder by establishing a vacuum for a short period of time, prior to the addition of the dispersing agent.

Dispersing agents according to the invention are preferably alkanes carrying hydroxy and/or amino groups, and/or compounds that can be derived from these alkanes by coupling them by means of the hydroxy and/or amino groups, or mixtures of these compounds, for example ethylene glycol, propane-diol-(1.2), propane-diol-(1.3), butane-diol-(1.3), butane-diol-(1.4) as well as pentane-diols and -triols, moreover glycerol, diethylene glycol, triethylene glycol, ethanolamine and diethanolamine, ethylene diamine, propylene diamine. When suspended in these compounds, the PTFE particles distinctly tend to form larger grains by agglomeration, after a slight increase in temperature. This typical effect produced by the dispersing agents is intensified by stirring, so that uniform, predominantly globular particles having a smooth relatively non-porous surface is formed.

This effect is very surprising since PTFE-powders which are treated under the same conditions and at the same temperatures with solvents or dispersing agents other than the aforementioned ones—for example aromatic hydrocarbons, higher hydrocarbons, esters of higher-boiling primary alcohols—are not at all changed as to their particle size.

The dispersing agent used according to the invention may be diluted by other liquids which are inert in the process of the invention, for example alcohols, esters, nitriles, ketones, aromatic or aliphatic hydrocarbons or water. When water is used as the diluent, it is advisable, on account of the hydrophobia of the polytetrafluoroethylene, to add simultaneously a small amount of a usual wetting agent, such as p-nonylphenol-polyethyleneglycol ether, tributylphenol-polyethyleneglycol ether or perfluoro-octanoic acid. The ratio of PTFE-powder to dispersing agent is not critical and can be varied within wide limits. Since, however, too thick a suspension may lead to the formation of lumps, on the one hand, and too low a concentration of PTFE weakens the granulating effect, on the other hand, it is advantageous to choose a ratio generally ranging from 1:1 to 1:10. For a coarse-grained material, the ratio advantageously ranges from 1:3 to 1:5, for finer powders, it preferably ranges from 1:4 to 1:7.

The stirring speed exerts its influence on the particle size of the granules to be formed. A high stirring speed generally favours the formation of fine-grained granules, a moderate number of rotations of the stirrer results in the formation of coarser granule particles. The stirring speed to be applied in each case depends on the particle size wanted as well as on the dimensions and shapes of stirring vessel and stirrer.

The minimum temperature necessary for obtaining a distinct granulating effect depends on the kind of the dispersing agent used and, to a small degree, on the initial grain size of the PTFE-powder. This temperature ranges from room temperature (20° C.) to 300° C., preferably from 50 to 150° C.

The process is generally carried out under atmospheric pressure which is, however, not a pre-requisite; the granulation may—physical constants and apparatus permitting —also be carried out under elevated or reduced pressure.

After having reached the necessary temperature, the PTFE-particles are usually agglomerated rather quickly to form larger particles of a globular shape and a dense surface. This temperature which is in the range mentioned above and depending on the type of the suspending agent and the grain size of the starting material is then maintained for another 15 to 60 minutes.

The suspension of granules obtained in this manner is worked up as follows: the granules and the suspending agent are separated from each other by known methods and the granules are liberated from the adhering remnants of suspending agent, for example, by a repeated stirring of the product under water or by a subsequent distillation with steam. The granules free from the suspending agent are then dried in a pneumatic conveying dryer or in a drying cabinet and, if required, classified into different grain sizes by means of a screen or another appropriate device. The suspending agent can be again used without further treatment. Only after having been used for a long period of time, it has to be purified by distillation.

The following examples illustrate the present invention, but they are not intended ot limit it thereto.

EXAMPLE 1

A four-necked flask of a capacity of 4 liters, provided with a stirrer, a thermometer and a cooler, was filled with 2.8 liters of ethylene glycol and, while stirring at 700 r.p.m. with a flat paddle mixer having a stirring surface of 4–5 cm.$^2$, 500 grams of screened PTFE-powder (prepared by polymerization of tetrafluoroethylene in an aqueous medium (suspension), for example according to German Pat. No. 1,109,370, medium grain size: 230$\mu$) were introduced. The mixture was stirred for a short period of time until a homogeneous distribution was obtained, the suspension was then heated to a temperature of 150° C. which was maintained for 45 minutes. Subsequently, the substance was quickly cooled to room temperature, the contents of the flask was poured onto a vacuum filter, the glycol was carefully filtered with suction, the granules on the vacuum filter were washed with a large amount of water (free from salt) and then dried in the drying cabinet at 140–150° C. for 12 to 24 hours.

There were obtained in this manner granules having excellent flow properties and a powder density in the range of from 500 to 650 grams per liter. The predominantly globular particles showed a smooth dense surface. The products did not any longer stick or form lumps.

By means of a sieve analysis, the grain sizes of several granules (A, B, C) thus prepared were determined:

|  | Particle size | | | | |
| --- | --- | --- | --- | --- | --- |
|  | More than 2,000$\mu$ | 1,200– 2,000$\mu$ | 600– 1,200$\mu$ | 300– 600$\mu$ | Less than 300$\mu$ |
| Proportions in: | | | | | |
| Granule A, percent | About 10. | 11 | 35 | 34 | 10 |
| Granule B, percent | About 16. | 23 | 26 | 27 | 8 |
| Granule C, percent | 14 | 21 | 26 | 32 | 7 |
| Starting material, percent | | | 10 | 25 | 65 |

Note.—Medium grain size: about 600$\mu$ (starting material: 230$\mu$).

EXAMPLE 2

A four-necked flask of a capacity of 6 liters, provided with stirrer, cooler and sump thermometer, was filled with 4.5 liters of glycol and, while vigorously stirring at 600–700 r.p.m. with a flat paddle mixer of a stirring surface of 5–6 cm.$^2$, 1 kilogram of screened PTFE-powder (suspension product-medium particle size: 230$\mu$) was added thereto in portions. As soon as a homogeneous suspension was obtained, it was heated to a temperature of 135° C. and the mixture was maintained at this temperature for 1 hour. The substance was then cooled to room temperature. On a washing vacuum filter, the glycol and the granules were separated from each other and the granules were carefully washed with 10 to 20 times the amount of water (free from salt). Finally, the product was dried in the drying cabinet at 140–150° C. for 12 to 24 hours.

The product treated in this manner consisted in granules of a predominantly globular shape and had excellent flow properties. The sieve analysis showed the following distribution of grain sizes:

|  | Particle size | | | | |
| --- | --- | --- | --- | --- | --- |
|  | More than 2,000$\mu$ | 1,200– 2,000$\mu$ | 600– 1,200$\mu$ | 300– 600$\mu$ | Less than 300$\mu$ |
| Proportions in: | | | | | |
| The granules, percent | 19 | 13 | 18 | 35 | 15 |
| Starting material, percent | | | 10 | 25 | 65 |

EXAMPLE 3

An enameled tank of a capacity of 50 liters, provided with stirring, heating and cooling facilities, was filled with 30 liters of glycol and 5 kilograms of a polytetrafluoroethylene dispersion polymer modified with about 0.05 to 0.1 % of perfluoropropene (in pulverulent form). The mixture was vigorously stirred until the particles were homogeneously distributed and no lumps could be observed. Under slow agitation (about 400 r.p.m.), the suspension was heated up. The granulation already started at a temperature slightly above 50° C. The mixture was maintained at a temperature in the range of from 80 to 90° C. for 30 minutes, then cooled while stirring until the suspension of granules again reached room temperature. By means of a vacuum filter, the suspending agent and the granules were separated from each other, the granules were removed from the vacuum filter, suspended in 20 liters of water and vigorously stirred. The washing water was let off after 3 minutes and the whole washing procedure was repeated several times with fresh water. The washed granules were dried on shelves in the drying cabinet at 140° C. for 20 hours and finally classified by screening:

|  | Particle size | | | | | | | |
| --- | --- | --- | --- | --- | --- | --- | --- | --- |
|  | More Than 3,000μ | 2,000– 3,000μ | 1,200– 2,000μ | 600– 1,200μ | 300– 600μ | 200– 300μ | 150μ | Less Than 150μ |
| Proportions in the granules, percent | 1.6 | 6.0 | 23.4 | 53.5 | 15.5 | | | |
| Proportions in the starting material, percent | | | | 13.4 | 26.1 | 27.1 | 17.0 | 16.4 |

NOTE.—Granules of a rather uniform grain size, medium size: about 1,000μ; starting material: medium size: about 330μ.

EXAMPLE 4

In an apparatus as described in Example 3, 900 grams of a pulverulent PTEE-dispersion polymer and 2,600 grams of a screened PTFE-suspension polymer were added while stirring to 18 liters of glycol and the mixture was stirred to form an intimate suspension.

The mixture was then heated, while stirring at 400–500 r.p.m., to a temperature ranging between 120 and 130° C. for a short period of time and then cooled quickly to room temperature. Glycol and granules were separated in known manner and the granules were aftertreated in the manner described in Example 3. The grain sizes of the product were as follows:

with 4.3 liters of diethylene glycol and, while stirring, 1.2 kilograms of screened PTFE-powder (suspension product-medium grain diameter: 230μ were then introduced. As soon as the powder was homogeneously distributed in the liquid, the mixture was heated and the stirring speed of the flat paddle mixer having a stirring surface of 5–6 cm.², was increased to 600–700 r.p.m. The temperature in the flask was maintained at 130–140° C. for 1 hour, the substance was then quickly cooled to room temperature and the contents of the flask was poured onto a vacuum filter. The diethylene glycol was carefully filtered with suction, the granules were washed with a large amount of water (free from salt) and finally dried in the drying cabinet at 150° C. for 12 to 24 hours.

The following table shows the distribution of grain sizes of 6 granules (A–F) prepared according to these indications:

|  | Particle size | | | | |
| --- | --- | --- | --- | --- | --- |
|  | More than 2,000μ | 1,200– 2,000μ | 600– 1,200μ | 300– 600μ | Less than 300μ |
| Proportions in: | | | | | |
| Granule A, percent | | 1.7 | 35.5 | 62.0 | 0.8 |
| Granule B, percent | | 2.0 | 34.0 | 63.0 | 1.0 |
| Granule C, percent | | 1.0 | 30.0 | 68.0 | 1.0 |
| Granule D, percent | | 1.5 | 53.0 | 44.5 | 1.0 |
| Granule E, percent | | | 51 | 48.4 | 0.6 |
| Granule F, percent | | 1.2 | 52 | 46 | 0.8 |
| Starting material percent | | | 10 | 25 | 65 |

The fine-grained products having excellent flow properties (medium particle size: 500–700μ) could be excellent processed by means of ram or screw extruders. The powder density of the coarse-grained proportions amounted to about 400–500, that of the finer proportions amounted to 500–650.

EXAMPLE 6

A four-necked flask of a capacity of 4 liters, provided with a stirrer, a cooler and a sump thermometer and filled with 2.75 liters of freshly distilled butane-diol-(1.4), was charged, while stirring, with 750 grams of screened PTFE-powder (suspension product). The number of rotations of the stirring paddle the surface of which was 4 to 5 cm.², amounted to 600–700 r.p.m. The contents of the

|  | Particle size | | | | | |
| --- | --- | --- | --- | --- | --- | --- |
|  | More than 3,000μ | 2,000–3,000μ | 1,200–2,000μ | 600–1,200μ | 300– 600μ | Less than 300μ |
| Proportions in the granules, percent | 0.4 | 4.3 | 9.5 | 29 | 50 | 6.8 |
| Proportions in the starting material dispersion | | | See Example 3 | | | |
| Proportions in the starting material suspension | | | See Example 2 | | | |

EXAMPLE 5

A four-necked flask of a capacity of 6 liters, provided with a sump thermometer, a stirrer and a cooler, was filled flask was then heated to a temperature in the range of from 140 to 150° C. for 30 to 50 minutes and subsequently quickly cooled again. The butane-diol-(1.4) was filtered from the granules with suction and the granules were carefully washed with 20 to 25 times the amount of water (free from salt). The product was finally dried in the drying cabinet at 140–150° C. for 12 to 20 hours.

There was obtained a finely-divided PTFE-granulate having good flow properties, no tendency of forming lumps and a powder density of 560. The sieve of some granules (A–C) thus prepared are indicated in the following table:

The granules obtained with a little coarser grains had the following composition:

|  | Particle size | | | | |
|---|---|---|---|---|---|
|  | More than 2,000μ | 1,200–2,000μ | 600–1,200μ | 300–600/μ | Less than 300μ |
| Proportions in: | | | | | |
| Granules A, percent | | 7 | 54 | 30 | 9 |
| Granules B, percent | | 9.3 | 49 | 28 | 13.7 |
| Starting material | | | 10 | 25 | 65 |

|  | Particle size | | | | |
|---|---|---|---|---|---|
|  | More than 2,000μ | 1,200–2,000μ | 600–1,200μ | 300–600μ | Less than 300μ |
| Proportions in: | | | | | |
| Granules A, percent | | | 34 | 63.8 | 2.2 |
| Granules B, percent | | | 40.8 | 58 | 1.2 |
| Granules C, percent | | | 43 | 54 | 3 |
| Starting material, percent | | | 10 | 25 | 65 |

EXAMPLE 7

In the apparatus described in Example 6, 800 grams of screened polytetrafluoroethylene (suspension product) were suspended in 2.7 liters of butane-diol-(1.3) and treated further as described in Example 6. There were obtained fine-grained granules having good flow properties and showing the following distribution of grain sizes.

|  | Particle size | | | | |
|---|---|---|---|---|---|
|  | More than 2,000μ | 1,200–2,000μ | 600–1,200μ | 300–600μ | Less than 300μ |
| Proportions in the granules, percent | | | 13.3 | 78.0 | 8.7 |
| Starting material, percent | | | 10 | 25 | 65 |

EXAMPLE 8

In the apparatus described in Example 6, 800 grams of screened PTFE-powder were suspended in 2.5 liters of ethanolamine and vigorously stirred. After some time, the mixture was heated up to a temperature in the range of from 90 to 110° C. and this temperature was maintained for 30–60 minutes, the substance was cooled, while still stirring, and finally the granules were separated from the ethanolamine by filtration. The granules were washed with 20 to 25 times the amount of water free from salt and then dried in the drying cabinet at 150° C. for 20 hours.

EXAMPLE 9

An enameled stirring vessel of a capacity of 100 liters was filled with 60 liters of glycol and 15 kilograms of PTFE-powder (suspension product) were added thereto. A homogeneous suspension was prepared by means of a turbine stirrer (400–600 r.p.m.) and then the contents of the vessel was heated to a temperature of 150° C. for 1 hour. After this period of time, the substance was quickly cooled to room temperature and the vessel was then emptied over a vacuum filter. The glycol was recycled into the vessel, the granules were briefly washed, removed from the filter, immersed into water and once more carefully washed with a large amount of water. After having been once more squeezed off, they were dried in the drying cabinet at 150° C. for 20 hours. There were obtained granules having excellent flow properties and the following distribution of grain sizes:

|  | Particle size | | | | | | | | | |
|---|---|---|---|---|---|---|---|---|---|---|
|  | Less than 150μ | 150–200μ | 200–250μ | 250–300μ | 300–400μ | 400–500μ | 500–600μ | 600–750μ | 750–1,000μ | 1,000–1,500μ |
| Proportions in the granules, percent | | | | | | 1.5 | 5.7 | 15.6 | 56.7 | 20.5 |
| Starting material, percent | 42.5 | 16.7 | 22 | 12 | 5.7 | 0.6 | 0.2 | 0.2 | | |

EXAMPLE 10

In an enameled stirring vessel of a capacity of 100 liters, 60 liters of glycol and 15 kilograms of a PTFE-powder (suspension product) were stirred by means of a turbine stirrer at 600–700 r.p.m. to yield a homogeneous suspension and the mixture was heated to a temperature of 130° C. for 50 minutes. After this period of time, the substance was quickly cooled to room temperature and the contents of the vessel was poured over a vacuum filter. The glycol was recycled into the vessel and the PTFE-granules were immersed into water in a washing container and washed, while slowly stirring, with a large amount of water. The washed granules were filtered in vacuo and then dried in a drying cabinet at 150° C. for 20 hours.

The sieve-analysis showed the following distribution of grain sizes:

|  | Particle size | | | | | | | | | |
| --- | --- | --- | --- | --- | --- | --- | --- | --- | --- | --- |
|  | 1,500–2,000µ | 1,000–1,500µ | 750–1,000µ | 600–750µ | 500–600µ | 400–500µ | 500–400µ | 250–300µ | 200–250µ | Less than 200µ |
| Proportions in the granules, percent | 4.9 | 40.3 | 12.7 | 13.1 | 7 | 8.4 | 6.5 | 3.8 | 1.7 | 1.6 |
| Starting material, percent |  |  |  |  |  | 1.1 | 12.9 | 15.2 | 4.7 | 56.1 |

|  | Particle size | | | | | | | | | |
| --- | --- | --- | --- | --- | --- | --- | --- | --- | --- | --- |
|  | Less than 150µ | 150–200µ | 200–250µ | 250–300µ | 300–400µ | 400–500µ | 500–600µ | 600–750µ | 750–1,000µ | 1,000–1,500µ |
| Proportions in the granules, percent | 0.2 | 1.2 | 1.5 | 3.7 | 9.6 | 19.8 | 22.8 | 23.0 | 17.2 | 1.0 |
| Starting material, percent | 43.4 | 16.2 | 12.6 | 14.4 | 11.8 | 1.0 | 0.2 | 0.2 | 0.2 |  |

EXAMPLE 11

In the same apparatus and under the same conditions as described in Example 9, 20 kilograms of a PTFE-powder (suspension product) were suspended in 80 liters of diethylene glycol. The number of rotations of the turbine stirrer was adjusted to 300 r.p.m., the vessel was heated up to a temperature of 140° C. for 70 minutes and then again cooled to room temperature. The contents of the vessel was worked up in the manner described in the preceding examples.

The granules obtained were perfectly suitable for a ram-extrusion and had the following distribution of grain sizes:

There were obtained relatively coarse-grained granules having good flow properties and the following distribution of grain sizes:

A four-necked flask of a capacity of 4 liters, provided with a stirrer, a cooler and a sump thermometer was filled with 2 liters of glycol, at first 150 milliliters of an aqueous PTFE-dispersion of 20% strength and then 360 grams of screened PTFE-suspension polymer powder were added thereto, while moderately stirring. The number of rotations was then increased to 300–400 r.p.m. and the mixture was slowly heated up. Already after a short period of time and at a temperature slightly above 30° C., an agglomeration of the particles could be distinctly observed. At the same time, the dispersion disintegrated and its solids proportion also precipitated on the suspended PTFE-particles, thus also favouring the agglomeration. The mixture was heated to a temperature in the range of from 40 to 50° C. for 1 hour, then cooled and finally the PTFE-granules obtained were separated, washed and dried in the manner described above.

Sieve-analysis of this product:

|  | Particle size | | | | | | | | | |
| --- | --- | --- | --- | --- | --- | --- | --- | --- | --- | --- |
|  | 1,000–1,500µ | 750–1,000µ | 600–750µ | 500–600µ | 400–500µ | 300–400µ | 250–300µ | 200–250µ | 150–200µ | Less than 150µ |
| Proportions in the granules, percent | 48 | 27.6 | 12.4 | 4.8 | 4.2 | 1.4 | 1.0 | 0.6 |  |  |
| Starting material, percent |  |  |  | 1.0 | 6.0 | 14.2 | 13.2 | 14.8 | 14.6 | 36.2 |

|  | Particle size | | | | | | | | | | |
| --- | --- | --- | --- | --- | --- | --- | --- | --- | --- | --- | --- |
|  | Less than 150µ | 150–200µ | 200–250µ | 250–300µ | 300–400µ | 400–500µ | 500–600µ | 600–750µ | 750–1,000µ | 1,000–1,500µ | 1,500–2,000µ |
| Proportions in the granules, percent |  |  |  |  | 2.0 | 9.3 | 14.3 | 16.9 | 20.5 | 31.8 | 5.2 |
| Starting material, percent | 38.7 | 17.4 | 14.7 | 15.2 | 12.9 | 0.9 | 0.2 |  |  |  |  |

EXAMPLE 12

A four-necked flask of a capacity of 4 liters was filled with a mixture of 1 liter of glycol, 1 liter of water and 1.5 milliliters of p-nonylphenol-polyethylene glycol ether. 700 grams of screened PTFE-powder (suspension polymer) were introduced, while stirring at 700 r.p.m., and the reaction mixture was then heated to a temperature of 90° C. for 60 minutes. The subsequent work up of the batch was carried out in known manner by filtering the suspending agent with suction and carefully washing the remaining granules on the vacuum filter with water free from salt. The still moist product was finally removed from the vacuum filter and dried in the drying cabinet at 140° C. for 15 hours.

EXAMPLE 14

1,000 milliliters of ethylene diamine hydrate were introduced into a four-necked flask of a capacity of 2 liters and 250 grams of a PTFE-powder the medium grain size of which hardly exceeded 50µ, were added thereto while stirring. The suspension was heated to a temperature of 80° C. and this temperature was maintained for 45 minutes. The substance was then allowed to cool while stirring, the PTFE-granules were separated and, after having been carefully washed several times with water free from salt, they were dried in a drying cabinet at 140° C. for 20 hours.

The granules had the following composition:

| | Particle size | | | | | | | | | |
|---|---|---|---|---|---|---|---|---|---|---|
| | 750–1,000μ | 600–700μ | 500–600μ | 400–500μ | 300–400μ | 200–300μ | 100–200μ | 75–100μ | 50–75μ | Less than 50μ |
| Proportions in the granules, percent | 0.6 | 24.8 | 37.6 | 12.0 | 10.0 | 5.6 | 9.4 | | | |
| Starting material, percent | | | | | | 0.8 | 5.8 | 16.4 | 29.4 | 47.6 |

I claim:

1. A process for preparing granulated polytetrafluoroethylene from the powdered feed consisting in thoroughly admixing:
   (A) said feed with
   (B) a dispersing agent comprising amino or hydroxy groups containing aliphatic hydrocarbon or corresponding coupled products thereof at a proportion of (A) to (B) of about 1:1–10 and a temperature of about 20–300°; and thereafter separating and recovering the granulated product and dispersing agent.

2. The process of claim 1 wherein the stirring is carried out at a temperature in the range of from 40 to 150° C.

3. The process of claim 1 wherein the polytetrafluoroethylene is an unsintered polytetrafluoroethylene which is obtained by polymerization of tetrafluoroethylene in an aqueous dispersion.

4. The process of claim 1 wherein the polytetrafluoroethylene is an unsintered polytetrafluoroethylene which is obtained by polymerization of tetrafluoroethylene in an aqueous dispersion and pulverizing the polymerization product.

5. The process of claim 1, wherein the polytetrafluoroethylene is a polytetrafluoroethylene obtained by polymerization of tetrafluoroethylene in the presence of a small quantity of a perfluoroolefin.

6. The process of claim 1 wherein the dispersing agent is at least one member of the group consisting of ethylene glycol, propane - diol - (1.2), propane-diol-(1.3), butane-diol - (1.3), butane-diol-(1.4), pentane-diol, glycerol, diethyleneglycol, triethylene glycol, ethanolamine, propanolamine, diethanol amine, ethylenediamine, and propylenediamine.

7. The process of claim 1 wherein the stirring is carried out in the further presence of a solvent which is inert under the reaction conditions.

8. The process of claim 1 wherein the proportion between polytetrafluoroethylene and the dispersing agent is in the range of 1:2 and 1:6.

References Cited

UNITED STATES PATENTS 3,265,679   8/1966   Black et al. _____ 260—92.1

FOREIGN PATENTS 1,100,388   1/1968   Great Britain.

JOSEPH L. SCHOFER, Primary Examiner
JOHN A. DONAHUE, Jr., Assistant Examiner

U.S. Cl. X.R.
260—875, 92.1